US006147622A

United States Patent [19]

Fonea

[11] Patent Number: 6,147,622

[45] Date of Patent: Nov. 14, 2000

[54] ELECTRONIC LOCK SYSTEM

[75] Inventor: Zeev Fonea, Nahariya, Israel

[73] Assignee: S.D.S. Smart Data & Security Systems Ltd., Nahariya, Israel

[21] Appl. No.: 09/154,204

[22] Filed: Sep. 16, 1998

[51] Int. Cl.[7] ........ G06F 7/04

[52] U.S. Cl. ........ 340/825.31; 70/278; 235/380

[58] Field of Search ........ 340/825.31, 825.69, 340/825.71; 235/382.5, 382, 380; 70/278

[56] References Cited

U.S. PATENT DOCUMENTS 3,889,501 6/1975 Fort ........ 340/825.31

4,972,182 11/1990 Novik et al. ........ 340/825.32

*Primary Examiner*—Michael Horabik
*Assistant Examiner*—Anthony A. Asongwed
*Attorney, Agent, or Firm*—Mark M. Friedman

[57] ABSTRACT

An electronic lock system which is also manually operable is provided for driving a lock cylinder to move a lock mechanism which includes at least one bolt. The lock system includes a bidirectional motor having a central axle mechanically engagable with the lock cylinder in a driving relation having a drive ratio of not more than about 2:1, and preferably of 1:1. A manually operable handle is mechanically linked in driving relation with the central axle to allow manual rotation of the central axle without activation of the motor.

9 Claims, 5 Drawing Sheets

ELECTRONIC LOCK SYSTEM

FIELD AND BACKGROUND OF THE INVENTION

The present invention relates to an electronic lock system and, in particular, it concerns an electronic lock system which can also be manually operated.

It is known to provide electronic locks of various kinds. Such locks may generally be viewed as being made up of three parts: an authorization module for selectively allowing activation of the lock by certain keys or personnel; an electromechanical actuation system for generating the required mechanical movement of the lock mechanism; and a control system for controlling the functions performed by the actuation system in response to authorized activation of the lock.

One example of an electronic lock system may be found in U.S. Pat. No. 4,972,182. As is typical of existing electronic lock systems, the actuation system employs an electric motor which operates with a high gear ratio, in this case through a worm gear drive, to drive the lock mechanism.

A shortcoming of such actuation systems lies in implementation of a mechanical override. This is a vital safety feature, allowing opening of the lock during electrical failures and the like, and should preferably be easily and rapidly operable. However, in any system with a high gear transmission between the motor and the lock mechanism, the gear system acts as a lock preventing direct turning of the lock mechanism itself. Instead, the prior art provides a manual input to the motor side of the gears, requiring a large number of turns to open the lock mechanism.

In an attempt to achieve a more rapidly operable manual control, some commercial products have attempted to provide a clutch arrangement to disconnect the gears for manual operation. Besides being complicated and expensive, such arrangements are also mechanically unreliable under the normal working conditions of a door which include repeated mechanical impacts and thermal deformations.

A further shortcoming of conventional electronic lock systems with manual override is that, when the lock mechanism has been manually turned, the lock cylinder may be left in an intermediate position in which operation of a mechanical key is impossible.

There is therefore a need for an electronic lock system of simple and cheap construction which provides for easy and rapid manual operation. It would also be advantageous to provide a robust electronic lock system which deactivates itself when the lock is obstructed and which automatically corrects any problems of misalignment.

SUMMARY OF THE INVENTION

The present invention is an electronic lock system which also allows manual operation.

According to the teachings of the present invention there is provided, an electronic lock system which is also manually operable for driving a lock cylinder to move a lock mechanism which includes at least one bolt, the system comprising: (a) a bidirectional motor having a central axle mechanically engagable with the lock cylinder in a driving relation having a drive ratio of not more than about 2:1; and (b) a manually operable handle mechanically linked in driving relation with the central axle to allow manual rotation of the central axle without activation of the motor.

According to a further feature of the present invention, the drive ratio is 1:1.

According to a further feature of the present invention, the motor is a step motor operative to turn through a series of predefined angular steps, and the system further comprises an angular measurement device associated with the motor and operative to identify at least a neutral angular position of the central axle corresponding to a neutral position of the lock cylinder.

According to a further feature of the present invention, there is also provided a control system associated with both the motor and the angular measurement device, the control system being configured: (a) to test during periods of non-operation of the motor whether the central axle is in the neutral position; and (b) if the central axle is not in the neutral position, to activate the motor to rotate the central axle to the neutral position.

According to a further feature of the present invention, there is also provided: (a) at least one sensor associated with the lock mechanism so as to provide an indication characteristic of the bolt reaching at least one predefined extended position; and (b) a control system associated with the motor, the angular measurement device and the lock mechanism sensor, the control system being configured: (i) to count a number of actuation pulses supplied to the step motor to actuate the motor in a locking direction; (ii) to compare the number of actuation pulses supplied to a predefined number related to the number of pulses normally required to move the lock mechanism until the bolt reaches the predefined extended position; and (iii) if the lock mechanism sensor indicates that the bolt has not reached the predefined extended position when the number of actuation pulses supplied exceeds the predefined number of pulses, to actuate the motor in an unlocking direction.

According to a further feature of the present invention, there is also provided: (a) a closure sensor deployed for identifying a closed state of a door within which the electronic lock system is deployed; (b) at least one lock mechanism sensor associated with the lock mechanism so as to indicate when the lock mechanism is in an unlocked state; and (c) a control system associated with the motor, the closure sensor and the lock mechanism sensor, the control system assuming an automatic locking state configured to actuate the motor so as to lock the lock mechanism after the door has been closed with the lock mechanism unlocked for a predefined period.

According to a further feature of the present invention, the control system also assumes a normal locking state configured to leave the lock mechanism unlocked indefinitely until a lock command input is provided.

According to a further feature of the present invention, one side of the cylinder is formed for operation by a conventional mechanical key, the system further comprising a control system associated with the motor, the control system being configured to short between at least two electrical contacts of the motor when the motor is not being activated so as to inhibit rotation of the central axle.

According to a further feature of the present invention, one side of the cylinder is formed for operation by a conventional mechanical key, and the system further comprises: (a) an electronic authorization module for providing an authorized actuation signal; (b) a motor axle sensor associated with the central axle and configured to provide an indication of whether the central axle has been angularly displaced from a neutral position; (c) a lock mechanism sensor associated with the lock mechanism and configured to provide an indication of whether the lock mechanism has been unlocked; and (d) a control system associated with the motor, the electronic authorization module, the motor axle sensor and the lock mechanism sensor, the control system being responsive to the authorized actuation signal to actuate the motor so as to invert a current state of the lock mechanism between unlocked and locked states, the control system being further responsive to unlocking of the lock mechanism without angular displacement of the central axle to generate an alarm signal.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an electronic lock system which also allows manual operation for driving a lock cylinder to move a lock mechanism.

The principles and operation of electronic lock systems according to the present invention may be better understood with reference to the drawings and the accompanying description.

Figure 1:
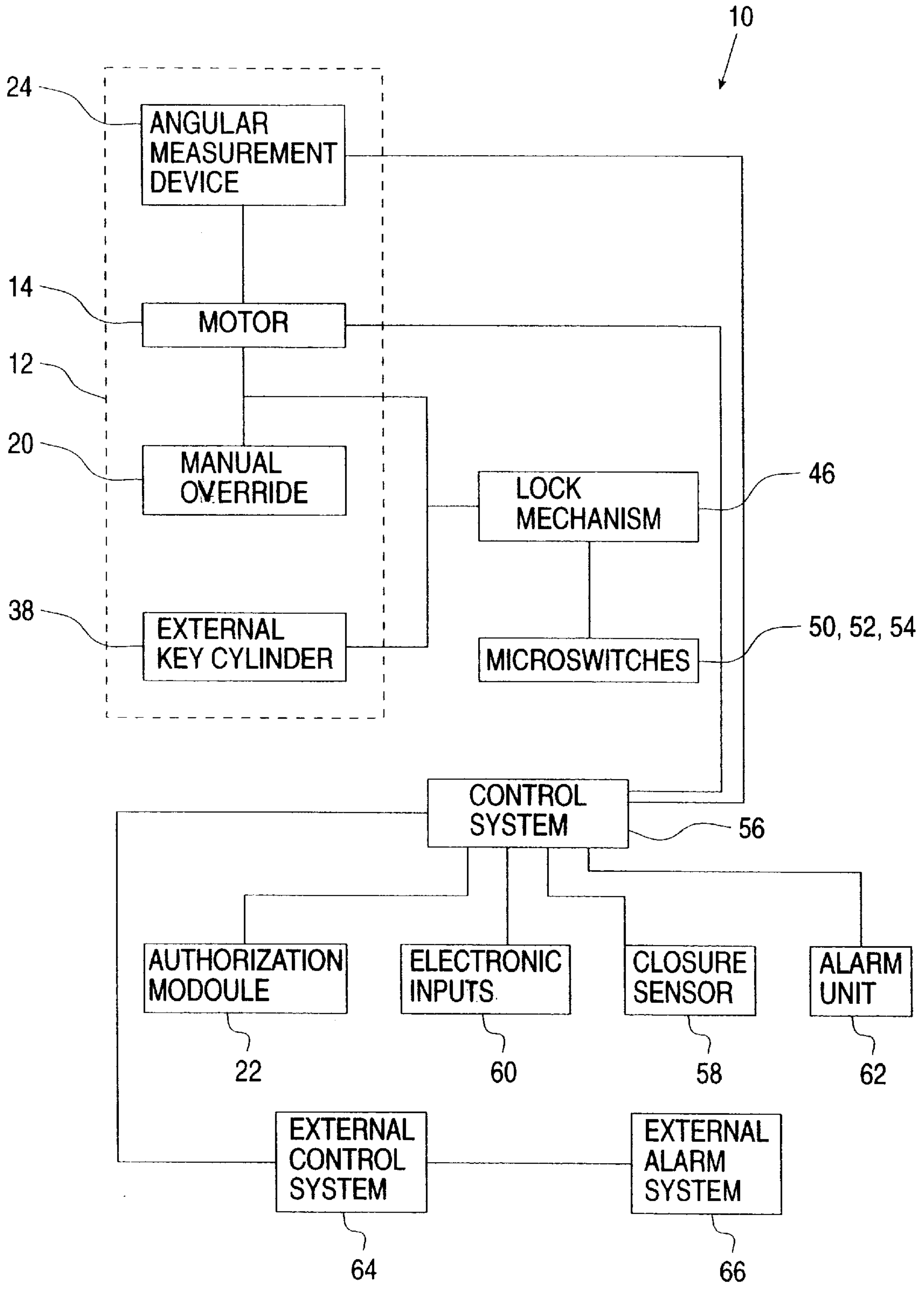
FIG. 1 is a block diagram of an electronic lock system, constructed and operative according to the teachings of the present invention.
Figure 2:
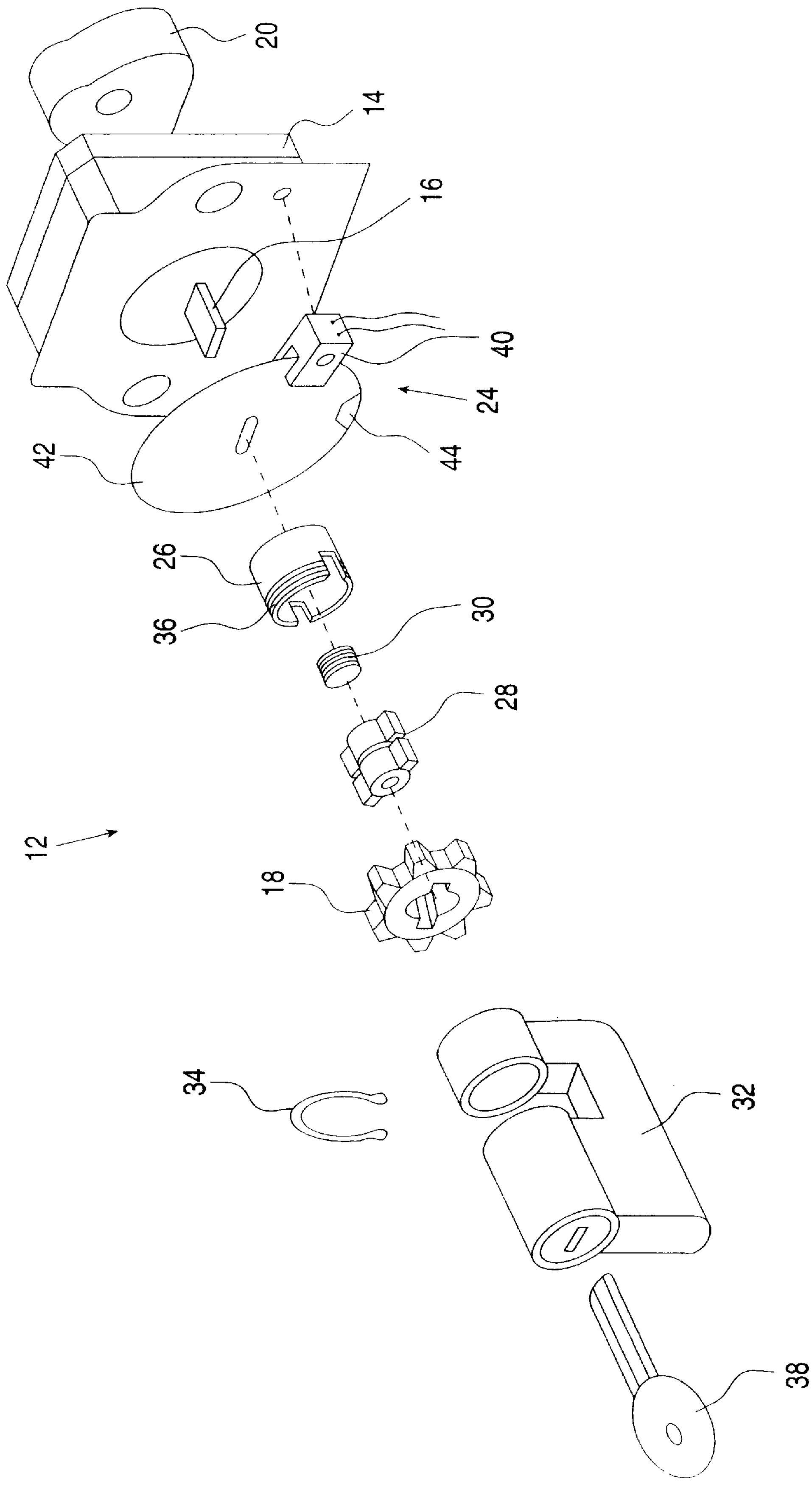
FIG. 2 is an exploded isometric view of an electromechanical actuation system from the electronic lock system of FIG. 1.

Referring now to the drawings, FIG. 1 shows an electronic lock system, generally designated 10, constructed and operative according to the teachings of the present invention. The electronic lock system includes an electromechanical actuation system 12, shown specifically in FIG. 2, for driving a lock cylinder to move a lock mechanism which includes at least one bolt.

Generally speaking, electromechanical actuation system 12 includes a bidirectional motor 14 having a central axle 16 which is mechanically engagable with a drive gear 18 of the lock cylinder in a driving relation having a drive ratio of not more than about 2:1, and preferably of 1:1. Electromechanical actuation system 12 also features a manually operable handle 20 mechanically linked in driving relation with central axle 16 to allow manual rotation of the axle without activation of motor 14. This ensures that manually operable handle 20 can easily and rapidly be used to open the lock from the low-security side of the lock in case of emergency.

It should be noted that electromechanical actuation system 12 may be used to advantage in a wide range of different types of electronic lock systems to allow manual operation whenever required. Thus, for example, lock system 10 may employ any type of authorization module 22 (FIG. 1) for authorizing opening of the lock from the high-security side of the lock including, but not limited to, electronic or magnetic key systems, combination lock systems, voice, fingerprint or image recognition systems, or any combination of the above. In a preferred implementation, a high security limited access electronic key system is used.

It will be apparent that implementation of the present invention is contingent on choosing and operating a motor 14 which can operate the locking system with the required drive ratio of no more than about 2:1, and preferably with a 1:1 ratio. Parenthetically, it will be understood that the ratio 2:1 is used to denote two rotations of the motor for every one rotation of drive gear 18. This requirement clearly varies according to the particular lock mechanism used. By way of example, for a typical domestic steel security door with four opposing bolts, the specified actuating torque is typically around 0.15 Nm. A suitable margin to ensure reliable operation under varying real conditions preferably includes roughly 200% excess torque. Thus, the motor chosen for such an application should provide a torque of about 0.45 Nm. It should be noted however that, because the motor is typically only activated intermittently for the short period necessary to operate the lock mechanism, the motor can typically be used significantly beyond its formal power specifications for continuous use.

In principal, any high torque motor can be used. Parenthetically, it should be noted in this context that a servo motor with an in-built high transmission ratio is not considered to provide a drive ratio of less than 2:1. In a preferred implementation of the present invention, a stepper motor is used. Stepper motors are characterized by their property of turning through a predefined angular step for each cycle of a two- or three-phase oscillating or switching supply current. Preferably, a stepper motor with at least about 40 steps per revolution, and typically at least about 100 steps per revolution, is used. This provides a high level of control over the movement, direction and angular position of the lock system, as will be described.

Turning now to the features of the electromechanical actuation system 12 in more detail, central axle 16 typically engages a drive socket 26 within which one side of a twin double-winged drive pin 28 is outwardly biased by a spring 30. Drive socket 26 is retained within a shortened side of an otherwise conventional cylinder stator 32 by a lock washer 34 which engages groove 36.

In the normal position of twin double-winged drive pin 28, biased outward by spring 30, central axis 16 is in direct 1:1 driving engagement through drive socket 26 and half of drive pin 28 with drive gear 18 so that rotation of central axle 16 either manually or by activation of motor 16 operates the lock mechanism. When the wings of both sides of drive pin 28 are aligned, insertion of a mechanical key 38 from the conventional side of cylinder stator 32 pushes drive pin 28 against spring 30 until the right side is completely withdrawn within drive socket 26, thereby disconnecting central axle 16 from the lock mechanism and allowing operation by mechanical key 38. The aligned state of drive pin 28 is referred to as the "neutral" position of the cylinder.

Electromechanical actuation system 12 preferably features an angular measurement device 24 associated with the motor. Angular measurement device 24 is configured to identify at least a neutral angular position of the central axle corresponding to a neutral position of the lock cylinder 26. Any design of angular encoder or other angle sensor may be used. In principle, use of a sophisticated encoder would be advantageous. This would provide continuous accurate information about the position of central axle 16, thereby monitoring operation of the system and indicating when a malfunction had occurred. In practice, such measurement devices add greatly to the cost of the system. Instead, by recognizing a particular synergy between the use of a stepper motor and various simple sensors in the lock mechanism to be described below, a preferred implementation of the present invention achieves a similar level of diagnostic functions using a very simple device 24 which senses only one position or small range of positions per rotation.

In the implementation shown here, device 24 has a fixed optical sensor 40 aligned with a disk 42 which is mounted on central axle 16. Disk 42 is generally opaque (i.e., relatively low optical transmissivity) with a relatively transparent window (or hole) 44. Clearly, an alternative implementation could have the opaque and transparent portions reversed. Device 24 is deployed so that optical sensor 40 and window 44 are aligned when the central axle and cylinder are in their neutral positions. As a result, the output of device 24 indicates at any time whether the axle is in its neutral position, independent of whether the cause of the motion is motor 14 or manual operation via handle 20.

Turning now to the lock mechanism which is designated 46 in FIG. 1, it should be understood that neither the type nor the construction of the lock mechanism is critical to the present invention. Thus the invention may be applied to any lock mechanism which includes one or more bolt which is displaced, linearly or otherwise, from an unlocked position withdrawn within a door to a locking position extending from the door to engage an adjacent element. Furthermore, the invention is equally applicable to systems in which the locking system is mounted other than in a door, such as in a frame around a door. At the same time, it should be noted that the invention is advantageously used in synergy with a multiple bolt lock, such as a lock having at least three separate moving bolts. Most particularly, the invention is especially valuable when used with locks which drive at least three bolts in different directions (e.g., into the top, bottom and side of a door frame).

While the lock mechanism per se is not a feature of the invention, most preferred embodiments of the invention employ at least one sensor associated with the lock mechanism. The function of this sensor is illustrated schematically in FIGS. 3A–3C. The particular implementation of the sensors will of course vary according to the lock design in question. In all cases, however, design and/or retrofit of suitable sensors is generally well within the abilities of one normally skilled in the art.

Figure 3A:
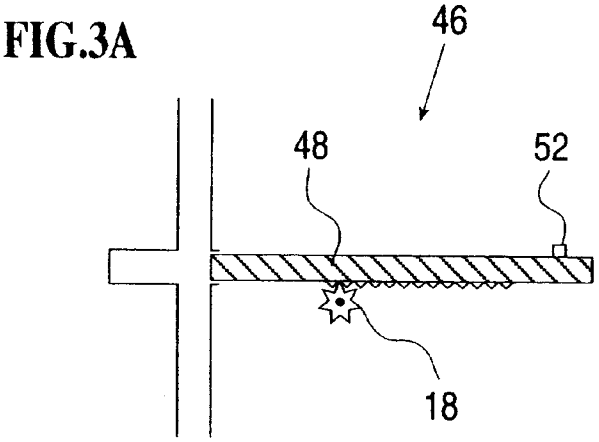
FIGS. 3A, 3B and 3C are schematic cross-sectional views of the lock mechanism and associated sensors from the electronic lock system of FIG. 1 in fully open, initial engagement and fully closed positions, respectively.
Figure 3B:
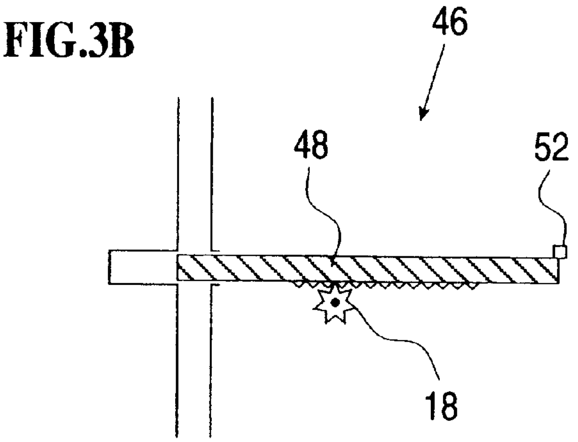
Figure 3C:
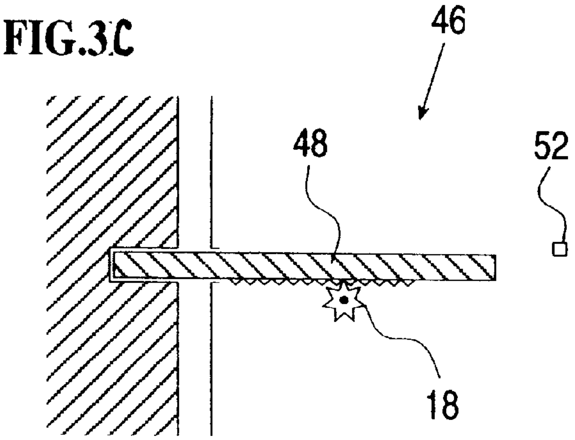

Thus, FIGS. 3A–3C show lock mechanism 46 schematically represented as a bolt 48 moved by drive gear 18 to move from a fully withdrawn unlocked position (FIG. 3A) to a fully extended locked position (FIG. 3C). FIG. 3B shows an intermediate partially extended position at which locking engagement first occurs.

In the preferred implementation shown here, a single lock mechanism sensor 52 is provided. Sensor 52 is deployed to identify when lock mechanism 46 passes a predefined extended position corresponding to the initial locking engagement of FIG. 3B. This is the critical point in the transition from the fully unlocked state of FIG. 3A to the fully locked state of FIG. 3C which defines whether the mechanism is currently effectively "locked" or "unlocked".

It should be noted that lock mechanism sensor 52 may be implemented as any suitable type of sensor. Although more sophisticated continuous sensors such as linear encoders, magnetic strip and bar code readers, could also be used, preferred implementations employ low cost switch-type sensors. Examples of suitable sensors include, but are not limited to, optical, mechanical and magnetic sensors or switches. In one particularly simple and cost effective solution, a mechanical microswitch may be directly associated with one or more moving elements of the lock mechanism to directly sense the position of the elements.

Referring now back to FIG. 1 to complete the structural description of electronic lock system 10, the system operates under the control of a control system 56. Control system 56 receives inputs from various sensors, including angular measurement device 24, lock mechanism sensor 52, and a closure sensor 58 deployed to identify a closed state of a door within which system 10 is deployed. Closure sensor 58 may be any desired type of sensor deployed to sense whether the door is currently closed. Most conveniently, this may be implemented using a proximity sensor as is known in the art of security alarms. Control system also receives signals from authorization module 22 on the high-security side of the door and from various electronic command inputs 60 on the low-security side. The latter typically include a push-button lock/unlock control, as well as various controls for changing the operational mode of the door and/or an alarm system as will be described. Control system 56 includes driving circuitry for generating the required form of power supply for driving motor 14. Control system 56 may also drive a local alarm unit 62, as well as providing one-way, or preferably two-way, communication interfaces with either or both of an external control system 64 and an external security alarm system 66.

Structurally, control system 56 is typically made up from a number of modules for performing different functions, each of which may be implemented in a wide range of forms. These include software modules, which are software programs performing the functions of the system as described below. These software modules may be written in any suitable programming language selected by one of ordinary skill in the art and can be run on a computer of any kind under a suitable operating system.

Alternatively, the modules may be implemented as hardware alone, or as a combination of hardware and software known as "firmware", which includes software programming instructions burnt onto a ROM (read only memory) chip. The precise implementation can easily be performed by one of ordinary skill in the art. In any case, the various modules are described below according to function rather than strictly as physically separate entities.

Turning now to the functional design of control system 56 and the corresponding operation of electronic lock system 10, normal electronic operation is as follows. If closure sensor 58 indicates that the door is closed, actuation of the lock/unlock button of electronic inputs 60 from the low-security side of the door, or an authorized actuation signal from authorization module 22 on the high-security side, causes control system 56 to initiate the normal locking or unlocking movement. In this case, the driving circuitry is activated to generate the required form of power supply to drive motor 14 in the appropriate direction.

As mentioned earlier, the relatively simple set of sensors provided in the most preferred implementation of the present invention are sufficient to provide highly effective diagnostic functions. This is achieved by monitoring the outputs of angular measurement device 24, lock mechanism sensor 52, and a count of the number of pulses provided to stepper motor 14, both during an initial calibration procedure and during each subsequent operation, as will now be described with reference to FIGS. 4, 5A and 5B.

Figure 4:
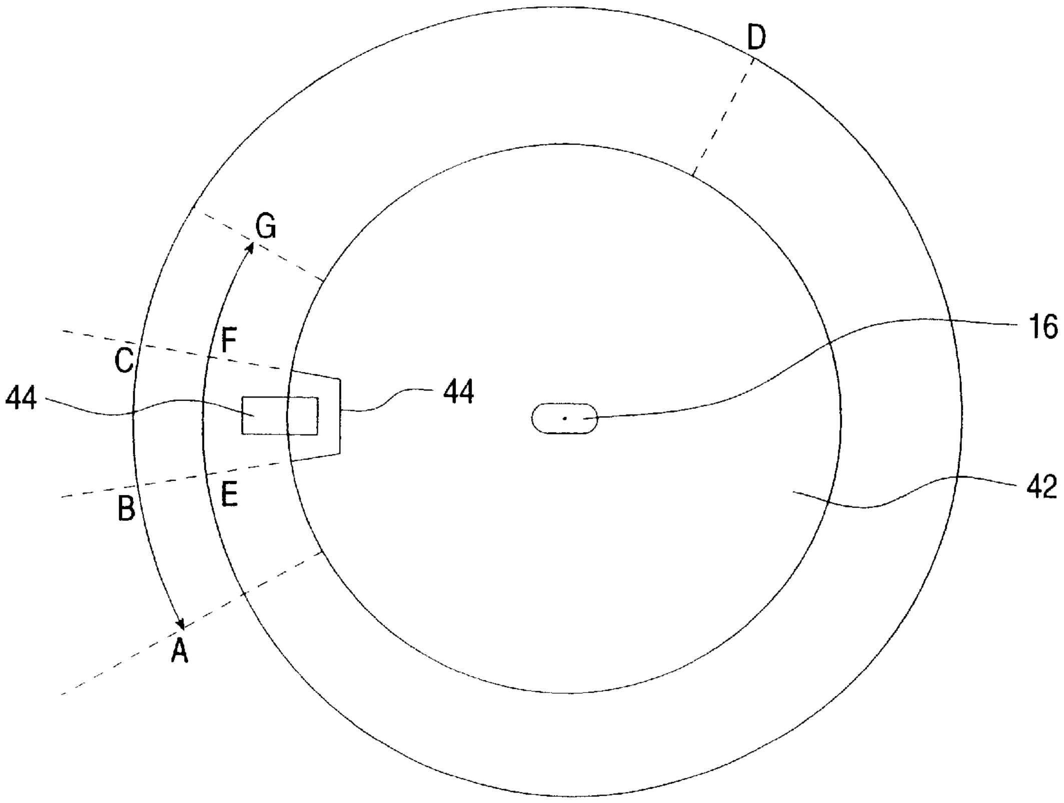
FIG. 4 is a side view of an angular measurement device from the electromechanical actuation system of FIG. 2.
Figure 5A:
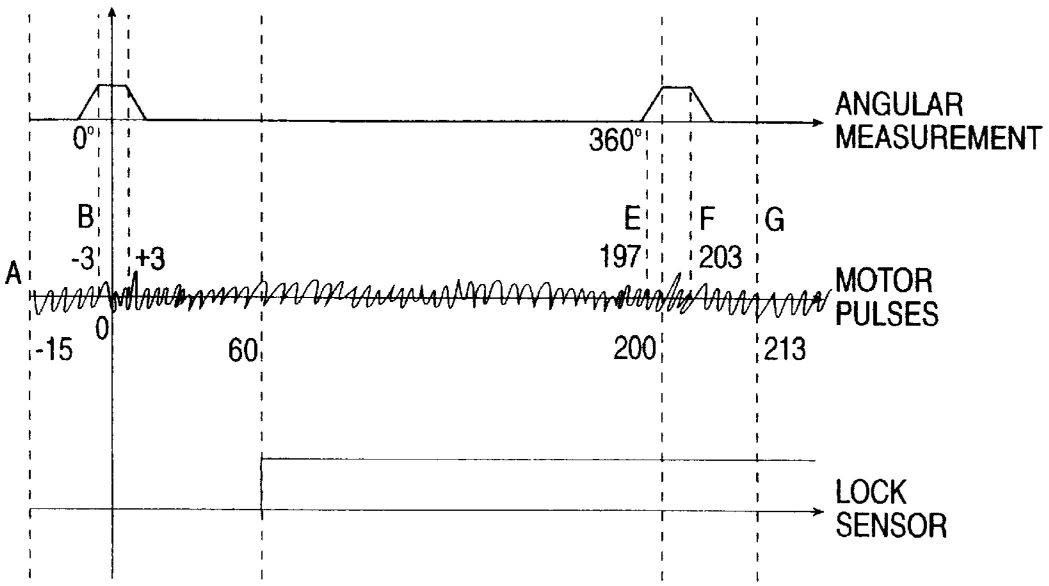
FIG. 5A is a schematic representation of various inputs monitored by the control system of the electronic lock system of FIG. 1 during proper locking operation.

On initial installation, and optionally in response to a specific recalibration input, the lock system performs a calibration procedure during which it generally determines at least three, and preferably at least five, reference positions for subsequent monitoring, as illustrated in FIG. 4. These positions are determined in terms of the number of pulses, or alternatively cycles, of the electrical supply to stepper motor 14 required to move central axle 16 and lock mechanism between various detectable states. The corresponding outputs of angular measurement device 24, lock mechanism sensor 52, and the drive pulses of stepper motor 14 are shown in FIG. 5A.

A typical calibration procedure would be as follows. First, motor 14 is driven in its unlocking direction by an excess number of pulses to ensure that it has reached the full extent of all free play in the lock mechanism. This point is designated A. From this position, motor 14 is driven in its locking direction and the number of pulses are counted to reach a points B and C corresponding respectively to the beginning and end of window 44 as sensed by angular measurement device 24. Motor 14 is then rotated further, with additional pulse counts being taken to correspond to point D at which lock sensor 52 indicates that the lock mechanism is locked, and points E and F corresponding to the beginning and end of window 44 near the locked end of the movement. Finally, the motor is driven with excess pulses to the second fully-locked extreme of free play in the lock mechanism before performing the entire counting procedure in reverse, counting the numbers of reverse pulses taken to reach each of the reference points, thereby allowing calculation of the final reference point G. The pulse count position for each point is then stored, preferably in non-volatile memory such as EEPROM, to be used as the "number of pulses normally required" to reach the corresponding reference point. The entire calibration procedure typically takes significantly less than one second.

This calibration procedure provides a basis for high precision operation and extensive self-testing of the system. For example, alignment of the system in its unlocked "neutral" position is preferably achieved by driving motor 14 to end position A, advancing through B to C, and reversing the motor through half the number of steps from C to B. This almost instantaneous alignment procedure provides self-test data by checking the number of pulses taken to reach points B and C. At the same time, it achieves precise central alignment within window 44 without requiring window 44 itself to be a high precision component.

Figure 5B:
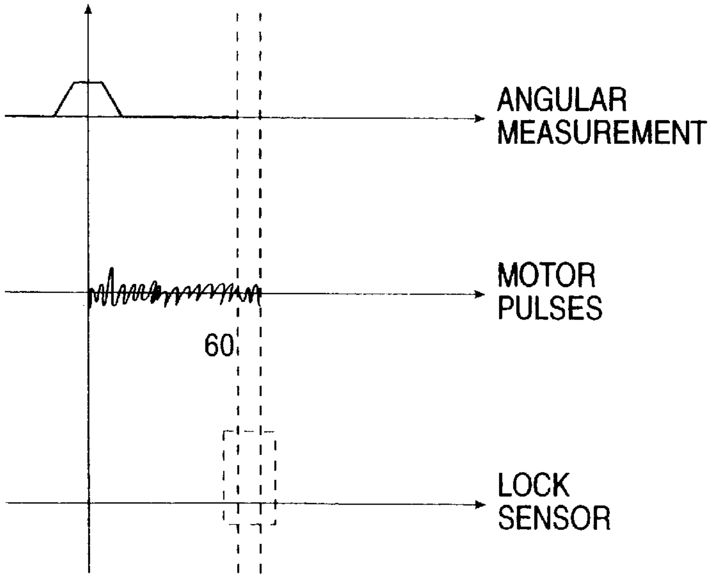
FIG. 5B is a schematic representation similar to FIG. 5A showing the corresponding inputs when a malfunction occurs during a locking operation.

Similarly, during subsequent operation of the motor in a locking direction, control system 56 counts the number of actuation pulses supplied to the step motor to actuate the motor in a locking direction and compares the count to the previously stored numbers. During proper operation, the outputs will again appear as in FIG. 5A. If the intermediate lock mechanism sensor 52 indicates that the bolt has not reached the first predefined extended position when the number of actuation pulses exceeds a predefined number set somewhat beyond the corresponding stored number, this indicates that the bolt of the lock mechanism is probably obstructed. This case is illustrated in FIG. 5B by the absence of the step generated by sensor 52. In this case, control system 56 actuates motor 14 in an unlocking direction, thereby avoiding stalling the motor. A similar test may be performed with regard to the number of pulses required to reach the neutral locked position sensed by angular measurement device 24.

An optional feature of control system 56 is provision of an automatic locking state in which the lock system provides a modified latch-type functionality. Many situations require latch-type functionality in which a door, once closed, cannot be opened from outside without a key. However, latch bolts are easily picked open, and also tend to be very inconvenient in situations where a door may unintentionally be closed while a person has momentarily stepped outside.

To address these problems, the present invention offers an automatic locking state in which control system 56 monitors the outputs from closure sensor 58 and lock mechanism sensor 52. If the door has been closed continuously with lock mechanism 46 unlocked for a predefined period, control system 56 actuates motor 14 so as to lock the lock mechanism. The predefined time delay solves the problem of inadvertent slamming closed of the door by allowing a grace period to reopen it. At the same time, once the lock mechanism has been activated, a much higher level of security is provided than could be offered by conventional latch bolts.

Preferably, this automatic locking state is provided as a user-selectable option, control system 56 also assuming a normal locking state configured to leave lock mechanism 46 unlocked indefinitely until a lock command input is provided.

Another important set of features of certain preferred implementations of the present invention relate to interaction between the electronic control system and manual operation. In existing electronic lock systems, manual override of the electronic system leads to major problems of misalignment and undefined position. In contrast, the present invention provides various features based on carefully built algorithms for identifying the source of the manual intervention and correcting any misalignment.

Firstly, it should be noted that operation of the lock of the present invention manually via handle 20 is immediately sensed by angular measurement device 24, as well as by one or more of the lock mechanism sensors. Operation via external key 38, on the other hand, disconnects central axle 16 so that the movement is sensed only by the lock mechanism sensors and not by device 24. Since opening of the lock from outside via mechanical key 38 is typically classed as an "emergency" procedure, control system 56 is preferably configured to respond to unlocking of lock mechanism 46 without angular displacement of the central axle 16 to generate an alarm signal, such as to alarm unit 62.

With regard to problems of alignment, control system 56 is preferably configured to test during periods of non-operation of motor 14 whether central axle 16 is in its neutral position. This test may either be performed intermittently whenever the motor is inactive or a given period after a manual operation has been detected. If central axle 16 is found not to be in its neutral position, control system 56 activates motor 14 to rotate central axle until is reaches its neutral position.

In this context, it will be noted that the "neutral position" exists both in the fully unlocked and the fully locked states of the system. As a result, various different options exist for the functionality of this realignment feature. Thus, in cases of misalignment, control system 56 may be configured to always turn the mechanism towards its unlocked state; to toggle between locked and unlocked states on the basis of the previous state of alignment; or to move to the nearest end position as indicated by lock mechanism sensor 52. Furthermore, since different options may be suited to different situations, two or more of these options may be provided as user-selectable options.

Finally, one further possible problem of misalignment could arise during operation of the lock via external key 38.

Although the right side of twin double-winged drive pin 28 is then disconnected from drive gear 18, frictional effects between the two halves of drive pin 28 may tend to turn central axle 16 out of alignment. This misalignment could also be corrected through the self-correcting feature described above. However, in one preferred implementation, an electric braking effect of motor 14 itself is used to prevent misalignment from occurring. To this end, control system 56 is configured to short between at least two electrical contacts of motor 14 while the motor is not being activated, thereby inhibiting rotation of central axle 16. Clearly, the electric braking effect equally acts to oppose manual operation of the lock via handle 20. However, this extra resistance has been found not to significantly interfere with operation of the handle when required.

It will be appreciated that the above descriptions are intended only to serve as examples, and that many other embodiments are possible within the spirit and the scope of the present invention.

What is claimed is:

1. An electronic lock system, which is also manually operable, for rotating a lock cylinder to move a lock mechanism which includes at least one bolt, the lock cylinder being mechanically coupled to the at least one bolt such that rotation of the lock cylinder causes displacement of the at least one bolt, the system comprising:

(a) a bidirectional motor having a central axle mechanically engagable with the lock cylinder in a driving relation having a drive ratio of not more than about 2:1; and (b) a manually operable handle mechanically linked in driving relation with said central axle to allow manual rotation of said central axle without activation of said motor.

2. The system of claim 1, wherein said drive ratio is 1:1.

3. The system of claim 1, wherein said motor is a step motor operative to turn through a series of predefined angular steps, the system further comprising an angular measurement device associated with said motor and operative to identify at least a neutral angular position of the central axle corresponding to a neutral position of the lock cylinder.

4. The system of claim 3, further comprising a control system associated with both said motor and said angular measurement device, said control system being configured:

(a) to test during periods of non-operation of said motor whether said central axle is in said neutral position; and (b) if said central axle is not in said neutral position, to activate said motor to rotate said central axle to said neutral position.

5. The system of claim 3, further comprising:

(a) at least one sensor associated with the lock mechanism so as to provide an indication characteristic of the bolt reaching at least one predefined extended position; and (b) a control system associated with said motor, said angular measurement device and said lock mechanism sensor, said control system being configured:

(i) to count a number of actuation pulses supplied to said step motor to actuate said motor in a locking direction;

(ii) to compare said number of actuation pulses supplied to a predefined number related to the number of pulses normally required to move the lock mechanism until the bolt reaches said predefined extended position; and (iii) if said lock mechanism sensor indicates that the bolt has not reached said predefined extended position when said number of actuation pulses supplied exceeds said predefined number of pulses, to actuate said motor in an unlocking direction.

6. The system of claim 3, further comprising:

(a) a closure sensor deployed for identifying a closed state of a door within which the electronic lock system is deployed;

(b) at least one lock mechanism sensor associated with the lock mechanism so as to indicate when the lock mechanism is in an unlocked state; and (c) a control system associated with said motor, said closure sensor and said lock mechanism sensor, said control system assuming an automatic locking state configured to actuate said motor so as to lock the lock mechanism after the door has been closed with the lock mechanism unlocked for a predefined period.

7. The system as in claim 6, wherein said control system also assumes a normal locking state configured to leave the lock mechanism unlocked indefinitely until a lock command input is provided.

8. The system of claim 1, wherein one side of the cylinder is formed for operation by a conventional mechanical key, the system further comprising a control system associated with said motor, said control system being configured to short between at least two electrical contacts of said motor when said motor is not being activated so as to inhibit rotation of said central axle.

9. The system of claim 1, wherein one side of the cylinder is formed for operation by a conventional mechanical key, the system further comprising:

(a) an electronic authorization module for providing an authorized actuation signal;

(b) a motor axle sensor associated with said central axle and configured to provide an indication of whether said central axle has been angularly displaced from a neutral position;

(c) a lock mechanism sensor associated with the lock mechanism and configured to provide an indication of whether the lock mechanism has been unlocked; and (d) a control system associated with said motor, said electronic authorization module, said motor axle sensor and said lock mechanism sensor, said control system being responsive to said authorized actuation signal to actuate said motor so as to invert a current state of the lock mechanism between unlocked and locked states, said control system being further responsive to unlocking of the lock mechanism without angular displacement of said central axle to generate an alarm signal.

* * * * *